US006532404B2

(12) United States Patent
Colens

(10) Patent No.: US 6,532,404 B2
(45) Date of Patent: Mar. 11, 2003

(54) MOBILE ROBOTS AND THEIR CONTROL SYSTEM

(76) Inventor: André Colens, rue du Baillois 5, Rixensart B-1330 (BE)

( * ) Notice: Subject to any disclaimer, the term of this patent is extended or adjusted under 35 U.S.C. 154(b) by 0 days.

(21) Appl. No.: 10/085,076

(22) Filed: Mar. 1, 2002

(65) Prior Publication Data

US 2002/0120364 A1 Aug. 29, 2002

Related U.S. Application Data

(63) Continuation of application No. 09/555,207, filed as application No. PCT/BE98/00185 on Nov. 27, 1998, now Pat. No. 6,389,329.

(30) Foreign Application Priority Data

Nov. 27, 1997 (BE) ............................................. 9700958
Dec. 22, 1997 (BE) ............................................. 9710046
May 7, 1998 (BE) ............................................. 9800341

(51) Int. Cl.[7] ............................................. G05B 15/00
(52) U.S. Cl. ..................... 700/262; 700/245; 700/258; 318/568.12; 318/587; 701/23; 701/300; 901/1; 901/46; 901/47; 706/905; 180/167
(58) Field of Search ................................ 700/262, 245, 700/258; 318/568.12, 587; 701/23, 300; 901/1, 46, 47; 414/227; 706/905; 180/167

(56) References Cited

U.S. PATENT DOCUMENTS

| 4,679,152 A | * | 7/1987 | Perdue ........................ 701/23 |
| 4,777,416 A | * | 10/1988 | George et al. ......... 318/568.12 |
| 5,787,545 A | * | 8/1998 | Colens ........................ 15/339 |
| 6,389,329 B1 | * | 5/2002 | Colens ....................... 700/262 |

FOREIGN PATENT DOCUMENTS

| EP | 0 665 962 B1 | 8/1996 |
| WO | 1258460 | 5/1995 |

OTHER PUBLICATIONS

Chee et al, Mobile robot area filing 1997, Advanced Intelligent Mechatronics '97, Final Program and Abstracts, IEEE/ASME International Conference in 1997.
UNK, SunMaster 200, 2000, Internet, pp. 1–3.
Simoncelli et al., Autonomous pool cleaning: Self localization adn autonomous navigation for cleaning, 2000, Internet, pp. 1–10.*
Mann et al., Chemical trail guidance for floor cleaning machines, no date, Internet, pp. 1–5.*

* cited by examiner

Primary Examiner—William A. Cuchlinski, Jr.
Assistant Examiner—McDieunel Marc
(74) Attorney, Agent, or Firm—Morgan, Lewis & Bockius LLP

(57) ABSTRACT

System of guidance and positioning relative to a fixed station (1) for an autonomous mobile robot (7) utilizing at least a directional infra-red beam (2') emitted by the fixed station, the mobile robot being provided with a directional system of detection (10a, 10b) of infra-red emission connected to a microcomputer incorporated in the said robot, the robot moving on a work surface in an essentially random manner, the microcomputer (44) including an algorithm able to control the return to fixed station (1) by displacement of the robot (7) towards the direction of emission of said infra-red beam (2'), characterized in that the infra-red beam (2') is a narrow directional beam and in that the system of detection (10a, 10b) is located on a frame at the center of rotation of the robot (7), oriented in the direction of movement of the robot, precise positioning in the fixed station (1) being carried out by rotation of the machine around a vertical axis according to an algorithm based on the detection of the narrow beam (2').

16 Claims, 10 Drawing Sheets

Figure 1:
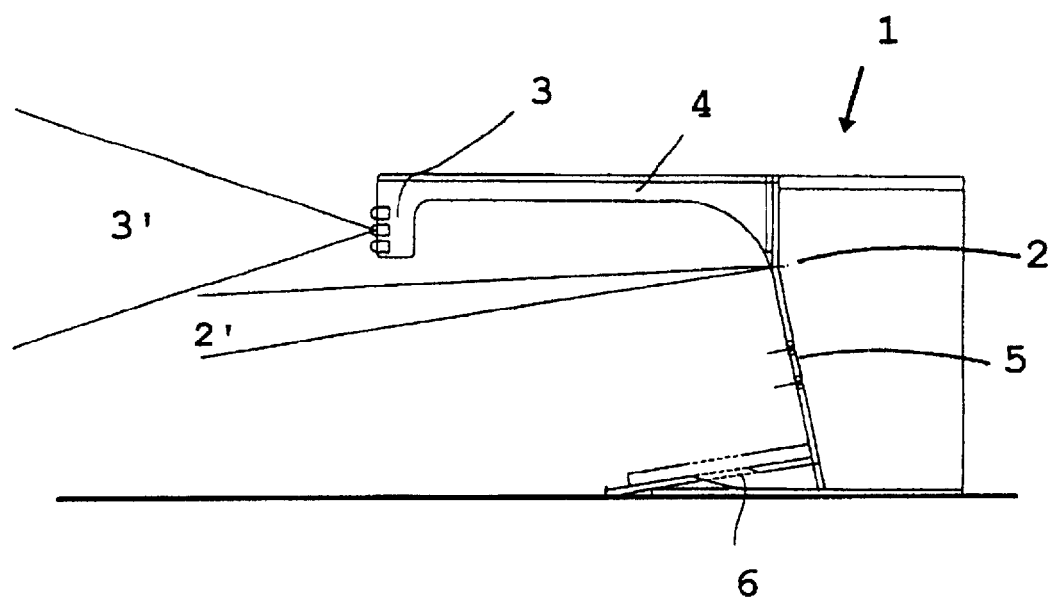

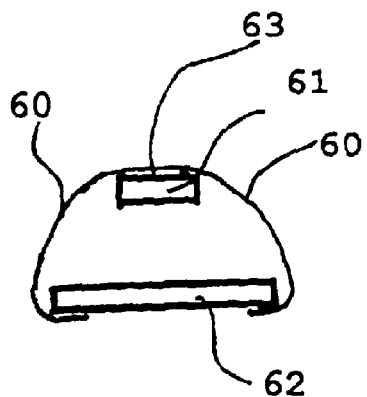
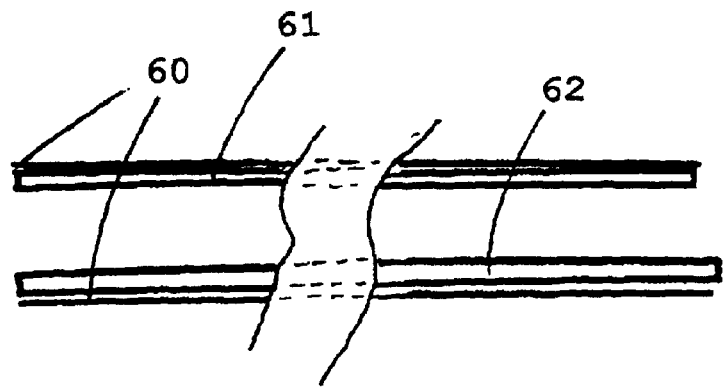
FIG. 12a  FIG. 12b
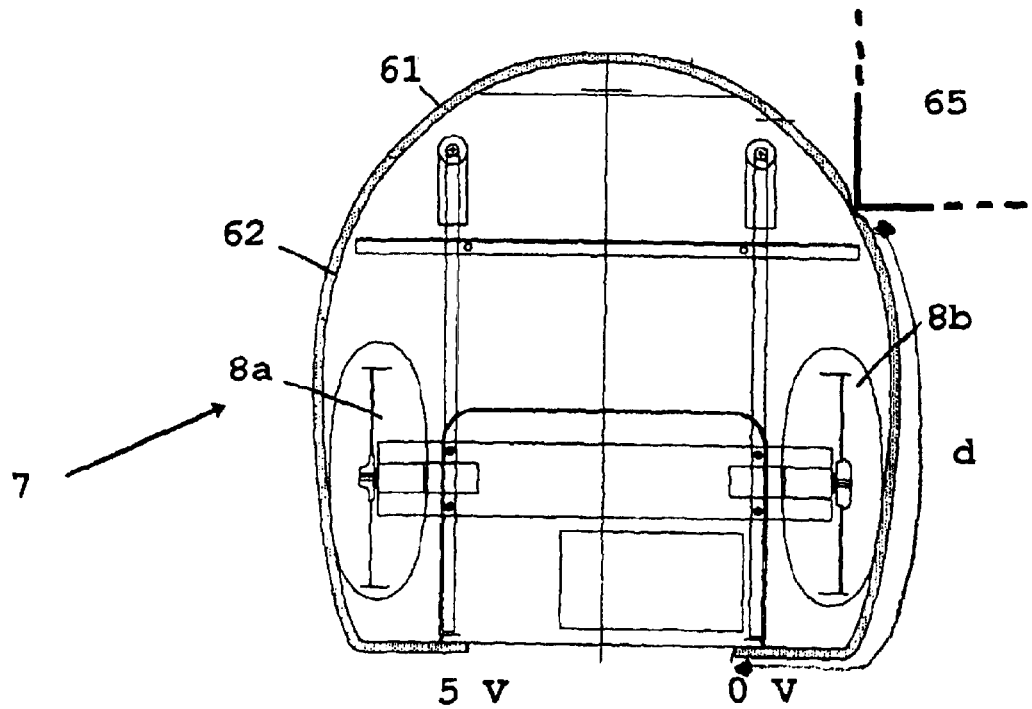
FIG. 12c

MOBILE ROBOTS AND THEIR CONTROL SYSTEM

This is a continuation of application Ser. No. 09/555,207 filed on May 26, 2000 now U.S. Pat. No. 6,389,329 which is a 317 of, International Application No. PCT/BE98/00185 filed on Nov. 27, 1998 and which designated the U.S.

The present invention relates to an autonomous mobile robot, preferably a robot for cleaning, and a system of control of a robot able to guide it towards a fixed station and/or able to adapt its behavior to the local degree of dirtiness and/or comprising a rotary brush and able to release the robot after the blocking of the aforementioned brush.

The invention relates more particularly to a system of guidance of the path of an autonomous mobile robot, including its positioning with respect to, and the approach towards, a fixed station of recharge in energy or discharge of elements collected by the robot. It will be, most frequently but not exclusively, a robot for cleaning the ground, which is provided with rechargeable batteries, for example a robotic vacuum cleaner. However it can also be a robot for spreading a substance or a monitoring robot.

An autonomous mobile robot, for example supplied with batteries, presents a limited autonomy. If one wants to obtain a continuous operation, the robot must be able to recharge its batteries at regular intervals of time. Other functions can also require the regular access to a fixed point for example the unloading of a bag of dust (robot-like vacuum cleaner) or re-supplying in fuel (thermal engine) or in a product to be spread.

A solution to this problem has already been disclosed (see EP-A-0744093), where in the mobile machine, sensitive to the gradient of an electromagnetic field, repositions itself automatically to the vertical of a coil traversed by a AC current.

In the case of surfaces comprising disturbing elements for the electromagnetic field (steel reinforcement of concrete for example), the above system operates with difficulty.

It can then be preferable to associate with the fixed station an infra-red radiation source (transmitting LED) allowing the mobile machine to locate the station remotely.

U.S. Pat. No. 4,679,152 discloses an autonomous mobile robot able to automatically return to a recharging station when the level of charge of a battery decrease below a predetermined threshold. The recharging station and the mobile robot are provided with a infra-read beam transmitter and a system of detection connected to a microcomputer. The robot and the recharging station may thus communicate in a bi-directional way. There is provided a search program with an opto-acoustic system which may involve a random moving of the robot on the work surface. Such system is complicated and appears to be poorly efficient when a very accurate positioning of the robot relative to the recharging station is required for the recharging operation. The purpose of the present invention is to overcome this drawback by providing, according to the simplest embodiment, a system using a narrow beam emitted by the recharging station, detectable by a directional sensor located on the chassis at the center of rotation of the robot.

According to a first aspect of the invention, a relatively narrow beam, varying for example between 2 and 10° preferably approximately 5°, emerges from the fixed station. The corresponding transmitter and the associated station are preferably oriented so that the beam extends over a maximum length of the work surface of the robot. The mobile robot, provided with a system of directional detection of infra-red emission, is moving substantially in a random way on this surface, crosses and detects the narrow beam in statistically periodic manner.

According to a preferred embodiment, if some duration of work is exceeded, e.g. 15 to 45 minutes, whatever the state of load of the battery, the robot will return towards the fixed station for a cycle of recharge or refill as soon as it crosses an infra-red beam of a given intensity. If it is near the station after the above-mentioned duration of work, it will join it and will thus start a reload. This process avoids the operation of seeking the beam when the state of the battery decreases below a predetermined level. The narrowness of the beam allows a precise final positioning relative to the fixed station, and thus allows, for example, a recharging operation by induction or more simply by physical contact of conductors.

As the working time increases, the algorithm of the microprocessor performs so that the threshold of intensity of the infra-red beam to be detected by the mobile robot decrease in a linear way or by increment, in order to initiate the return step.

The stage of return can cause the discontinuance of all the functions of the robot which are not essential in order to find the station of recharge or refill.

According to another embodiment of the invention, the system of guidance and of positioning is based upon at least two beams of different directionality property emerging from the fixed station, the beam(s) less directional being used for the approach towards the fixed station, while the more directional beam is used for the ultimate stage of precise positioning of the robot relative to this fixed station. This alternative allows the guidance of the robot in a more complex environment (e.g. an apartment with several rooms, with several doors).

The transmitter of the less directional beam is located at a level of the fixed station so that its influence decreases at the ultimate stage of approach and of positioning of the robot. It can be manually directed as desired and located at the end of an overhanging arm above the front part of the fixed station itself.

In the phase of positioning, the transmitter will thus be advantageously located above the robot, the beam emitted being then out of the detection plane of the sensors of the robot. The latter, by a movement of rotation around its center, is then able to determine a final position of recharge, for example with physical contact, while basing itself on the signal of the transmitter of stronger directionality located in the detection plane of the sensors of the robot. The power of the beams can be different, the most powerful beam being generally but not necessarily the least directional beam.

The robot includes a directional system of detection of infra-red emission, for example comprising at least two directional sensors for which intensities of signals are compared, in a known way, by a microcomputer to control a rotation towards the source of emission. These sensors are preferentially located on the chassis at the center of the robot, oriented in the direction of movement of the robot. Possibly, one or several other sensors may be provided, for example on the lateral sides or on the rear side, advantageously having directional detection system substantially opposed to that of the central sensors. Advantageously also, the beams to be recognized by the sensors of the robot will be modulated in order to avoid any background noise.

According to this aspect of the invention, there is proposed a system of location and positioning relative to a fixed station for an autonomous mobile robot moving in a room characterized in that the fixed station emits two modulated infra-red beams, primarily in the plane of the rooms, one of the beams being appreciably more directional than the other. The least directional transmitter beam allows the location and the approach of the fixed station by the mobile robot provided with directional sensors sensitive to these beams. The signals of the sensors are treated by one microcomputer controlling the advance of the mobile robot, the transmitter of weaker directionality being located on the fixed station at a position perpendicular to the mobile robot when the latter joins its desired position in the fixed station, the more directional beam is then able to be detected in a more sensitive way by the aforementioned sensors, precise positioning being carried out by rotation of the machine about a vertical axis according to an algorithm based on the detection of the narrow beam.

According to an alternative one proposes a system of location and of positioning at a fixed station for a mobile autonomous robot moving in a room characterized in that the fixed station emits at least three infra-red modulated beams, one of the beams being appreciably more directional than the others. Transmitters of the least directional beam, and generally moreover stronger intensity, allows the location and the approach to the fixed station by the mobile robot carrying the directional sensors directional sensitive to the known as beams. Signals from the sensors are treated by a microcomputer controlling the advance of the mobile robot, the transmitters of less directionality being oriented and being located on the fixed station such that the beams cross each other in the immediate vicinity of the station. The most directional beam, which can be of lesser intensity, is then able to be more easily detected by the aforementioned sensors, precise positioning being carried out by rotation of the machine around a vertical axis according to an algorithm based on the detection of the narrow beam.

According to still another embodiment, the modulation of the beams emitted by the fixed station, including then a microcomputer, can transmit information to the robot, or to one robot among others if several robots are used with the same central station. This information can refer to availability of the station for a recharge operation an/or discharge, or can constitute an instruction relating to the working method, or to stopping or recall of the robot, sound localization of the robot etc. Possibly one can also envisage a transmission in return towards the fixed station, with the assistance of an infra-red transmitter carried by the robot.

The present invention also relates to a technique of guidance for the vacuum-cleaning of ground of dust, applicable to the autonomous robots used for cleaning.

Document EP-A-0769923 discloses a mobile autonomous machine for the vacuum-cleaning of ground, of low power and of small size allowing it to cover easily a surface encumbered by, for example, pieces of furniture.

The recharge of the batteries of the robot is advantageously coupled with the discharge of accumulated dust.

The content of the above-mentioned document is incorporated by reference in the present description.

The low power of this suction robot does not always allow however to carry out a thorough cleaning in only one passage. It can thus be necessary when the machine is over a particularly dirty surface, to envisage a longer time of passage (for example passing from a velocity of 20 cm/sec to 10 cm/sec) and/or to have additional passages to clean surface completely.

To this end, according to another aspect of the invention, a particular technique of cleaning is provided, such technique being applicable to any autonomous robot used for vacuum-cleaning and/or brushing.

The technique of guidance for the cleaning of ground by a robotic vacuum cleaner is indeed characterized in that the path followed by the robot depends on the quantity of particles present on the surface to clean, the aforementioned quantity being estimated by an analyzer of particles located near the opening of suction, or in one cavity of brushing of the robot, the aforementioned analyzer sending signals to a microcomputer carried by the mobile robot and controlling the displacement of the robot according to the said signals.

In addition, the aforementioned analyzer of particles can have the function of determining the degree of filling of the dust tank. If dust accumulates beyond a certain point the same infra-red beam located after the suction opening, that is to say at the level of the tank preceding the filter, will be stopped, which the microcomputer will interpret as a corresponding signal.

According to the measured quantity of aspired dust, the microcomputer can for example control one deceleration and/or a linear forth and back movement of the mobile robot.

The microcomputer can also control a movement of systematic cleaning, for example a forth and back movement in fan order.

Advantageously the microcomputer can take into account the size of the particles and their number, according to the amplitude and the frequency of the signals emitted by the analyzer of particles. An analysis of the type of dust collected, thanks to the knowledge of the size of the grains and of their number, makes it possible to refine the robots, behavior by correcting its path, the number of revolutions of the brush and/or the power of the vacuum cleaner turbine.

The analyzer of dust comprises for example a transmitter and a receiver, preferably in the infra-red.

The microcomputer can advantageously keep in memory a global average of the level of dust detected by the sensor of dust on a long distance, the activation of a particular cleaning algorithm taking account of the aforementioned average.

Moreover, advantageously, the suction robot can include a sensor of dust wherein one or several elements are periodically or constantly automatically cleaned by a flow of air oriented towards its surface.

According to another aspect of this invention the autonomous robot is a robot including a rotary brush.

The invention thus proposes a surface cleaning robot comprising as element of cleaning at least a rotary brush, and comprising a microcomputer controlling at least, via an algorithm, the velocity and/or the path of the robot characterized in that the microcomputer is associated with an algorithm which take account, to determine the aforementioned speed and/or the aforementioned path, of at least of the rotational velocity of the aforementioned rotary brush. The robot for cleaning is typically a robotic vacuum-cleaner.

Advantageously, the microcomputer of the robotic vacuum-cleaner takes account, in order to determine the power of aspiration, of the rotational speed of the aforementioned rotary brush. The suction power can inter alia be dependent on the number of revolutions of the aforementioned brush.

The microcomputer is therefore able to take account of the measurement of number of revolutions of the motor to determine the behavior of the aforesaid robot.

The presence of a rotary brush presents however the disadvantage of seeing the brush blocking itself when it meets, for example, the fringes of a carpet laid out on the surface to clean.

A solution with this problem was described in the patent application PCT WO 97/40734 and consists in reversing the direction of rotation of the brush so as to release it.

The solution of the present application has the advantage of not requiring a precise control of the brush, nor the inversion of its way of rotation. This simplifies the design of the robot. This more simple solution appeared to be more effective in practice.

The device according to the invention includes a system comprising a rotary brush—driven by a motor—activated by microcontroller (or microcomputer) controlling the whole of the functions of the autonomous robot. Reference is made in this respect at the patent application PCT WO 96/01072 incorporated herein by reference.

The number of revolutions of the brush is analyzed by the microcontroller, preferably constantly.

This measurement can be carried out according to several known techniques (measurement of the consumed current by the motor in the case of a dc motor, measurement of frequency of the impulses in the case of a motor without brushes, optical coder).

The measurement of this number of revolutions allows the microcontroller to deduce certain information concerning, for example, the nature of the cleaned surface or the occurrence of an incident and to adapt the robot's behavior consequently.

At the time of occurrence of an incident such as the halt of the rotary brush, caused for example by the rolling up of fringes of a carpet around the axis of the brush, the microcontroller will disconnect the brush and will cause the robot to start a series of operations of disengagement.

This operation can be, according to the design of the robot, one mechanical disengagement but will be preferably an electric disconnection of the motor.

As an example some particularly efficient maneuvers are described hereafter.

The robot moves back of a distance equal to its diameter (brushes disconnected). By doing this the fringes exert one effort of unfolding on the axis of the brush which is in free wheel.

The brush is released. The retreat brings the robot outwards of the zone of the fringe. The robot rotates then while re-engaging the brush. If, at this stage, the brush is still blocked, it stops its rotational movement and the robot performs a new retreat to again attempt to permit the rotation of the brush and so on until the brush is released.

The maximum number of reiterations is fixed by the program and by the maximum free distance for retreat of the robot.

If this maximum distance is reached without the brush being released, the robot will continue the iterations but in forward motion.

If no operation succeeds in releasing the brush, the robot is put in a waiting status associated to a signal, and a manual intervention is necessary.

Advantageously, the analysis of the number of revolutions of the brush also makes it possible to know the nature of the ground cleaned.

A high number of revolutions reflects a smooth ground, a slower speed reflects a surface covered with a carpet. The slower the speed, the thicker the carpet. This analysis allows the robot to adapt its velocity in advance and to adapt the suction power according to the nature of the ground to be cleaned.

The invention can be applied to cleaning robots other than vacuum cleaners, for example to robots for cleaning unspecified surfaces with liquids or to robots to wax parquet floors.

The invention thus relates also to a cleaning robot comprising a rotary brush and a microcomputer, a means for detecting the blocking of the rotary brush which is associated to the microcomputer, an algorithm of disengagement of the robot, a means of disengaging the rotary brush relative to the associated motor, the algorithm including causing a movement of retreat of the robot followed by a rotation and the resumption of the forward movement of the robot.

The means of disengagement consists advantageously in a disconnection of the motor from its electrical supply.

In short, the robot for cleaning a surface according to one aspect of the invention comprises at least a rotary brush, the speed and/or the path and/or possibly the suction power of a turbine, being dependent on the revolution speed of the aforementioned rotary brush.

For a robotic vacuum-cleaner, in particular a domestic one, the rotational movement of the brush takes place preferably in a vertical plane relative to the surface to be cleaned.

The invention relates also to method of operation of a cleaning robot as above-mentioned, the blocking of the rotary brush being detected by the aforementioned microcomputer which controls then an operation for releasing the robot. The aforementioned releasing operation comprises at least a disengagement of the said rotary brush relative to the motor operating it, coupled to a movement of retreat of the robot followed by a rotation and the resumption of the forward moving of the robot. The operation possibly includes several cycles of disengaging-retreat-rotation-forward movement.

According to still another aspect of the invention, which can be applied to any autonomous mobile robot, more advantageously to robots of great dimension (p.e. 80 to 250 cm), the robot comprises a linear sensor of collision surrounding entirely or partly the lower portion of the careenage in the plane of movement. The sensor is made of a metallic linear conductor and, in parallel, a linear plastic conductor element, for example made out of conducting rubber. The unit can be included in a sheath or an insulating flexible membrane fixed along the edge of body. For example, the linear elements are fixed by gluing two internal opposite faces of the sheath. These two elements are separated by a small distance. The ends of the conducting plastic are subjected to a potential difference, for example of 5 volt, that is to say 0 volt at an end and 5 volt at the other end. At the occurrence of a collision of the robot with a frontal or lateral obstacle, one of the two elements is able to come elastically into contact with the other element under the effect of a temporary pressure resulting from the impact of the robot with the obstacle. It will be understood that the instantaneous voltage on the conducting element is a function of the distance from the point of impact to one of the end of conducting plastic, which has a higher resistance. Thus a measured voltage of 2,5 volt means that the impact took place roughly at the middle of the linear sensor. The measured voltage at the level of the conducting element thus constitute a signal sent to the microcomputer in order to locate the point of impact at the basis of careenage.

The improvements according to the invention are to be applied more particularly to mobile robots moving, in their mode of normal operation, in a random way without any system of precise positioning.

The various aspects of the invention will be better understood with the additional description which follows, which refers to the annexed drawings provided as examples only, and thus without limiting the scope of the additional description. Each described feature, taken separately, may be generalized in accordance with the knowledge of the expert. Identical number references in the drawings relates to identical equivalent elements.

Figure 2:
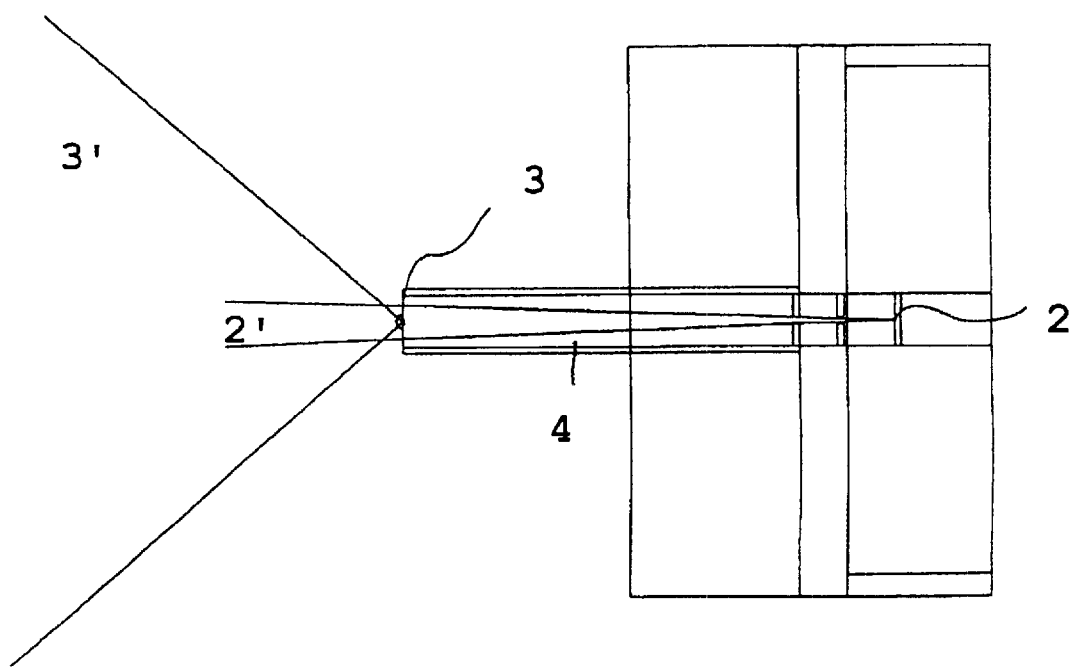
Figure 3:
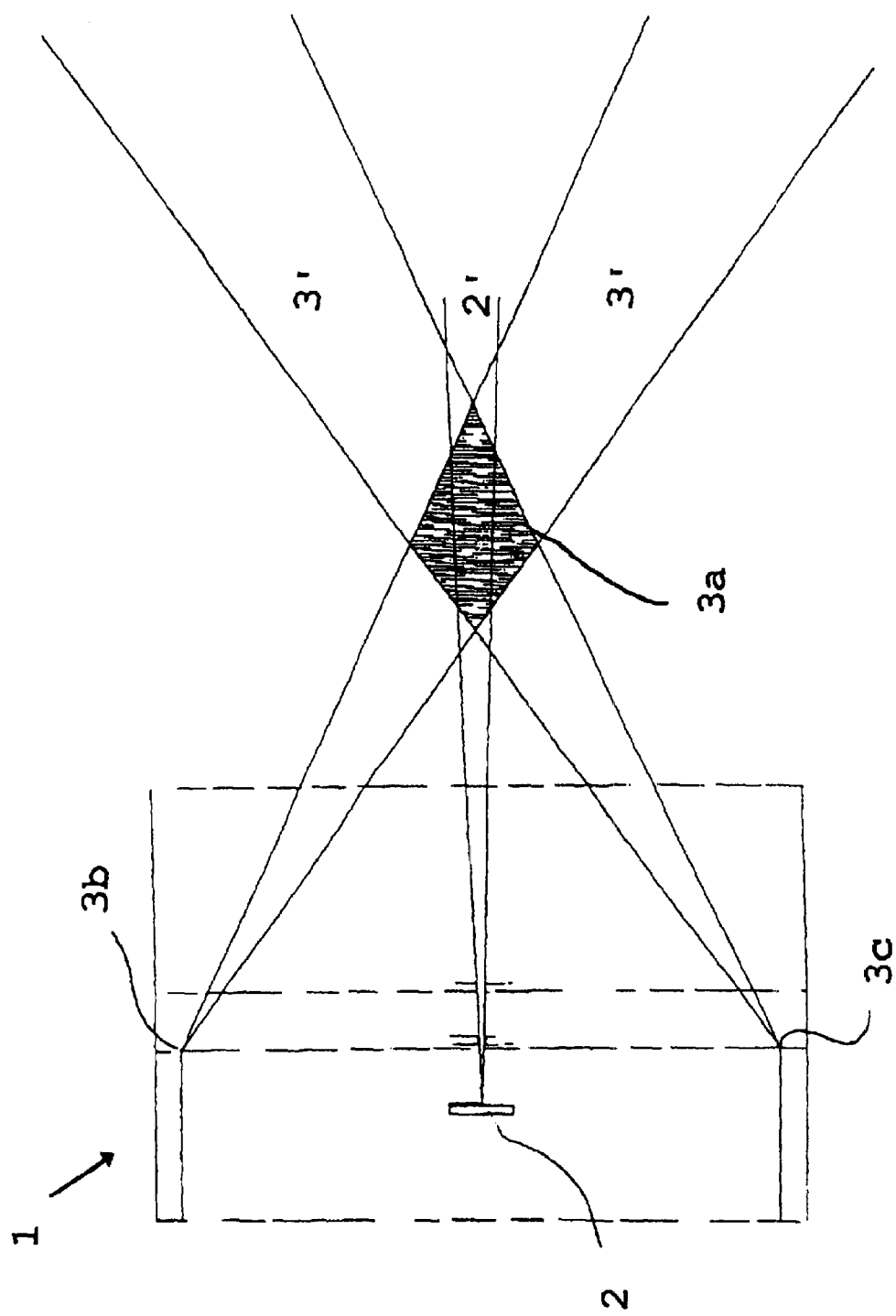
Figure 4:
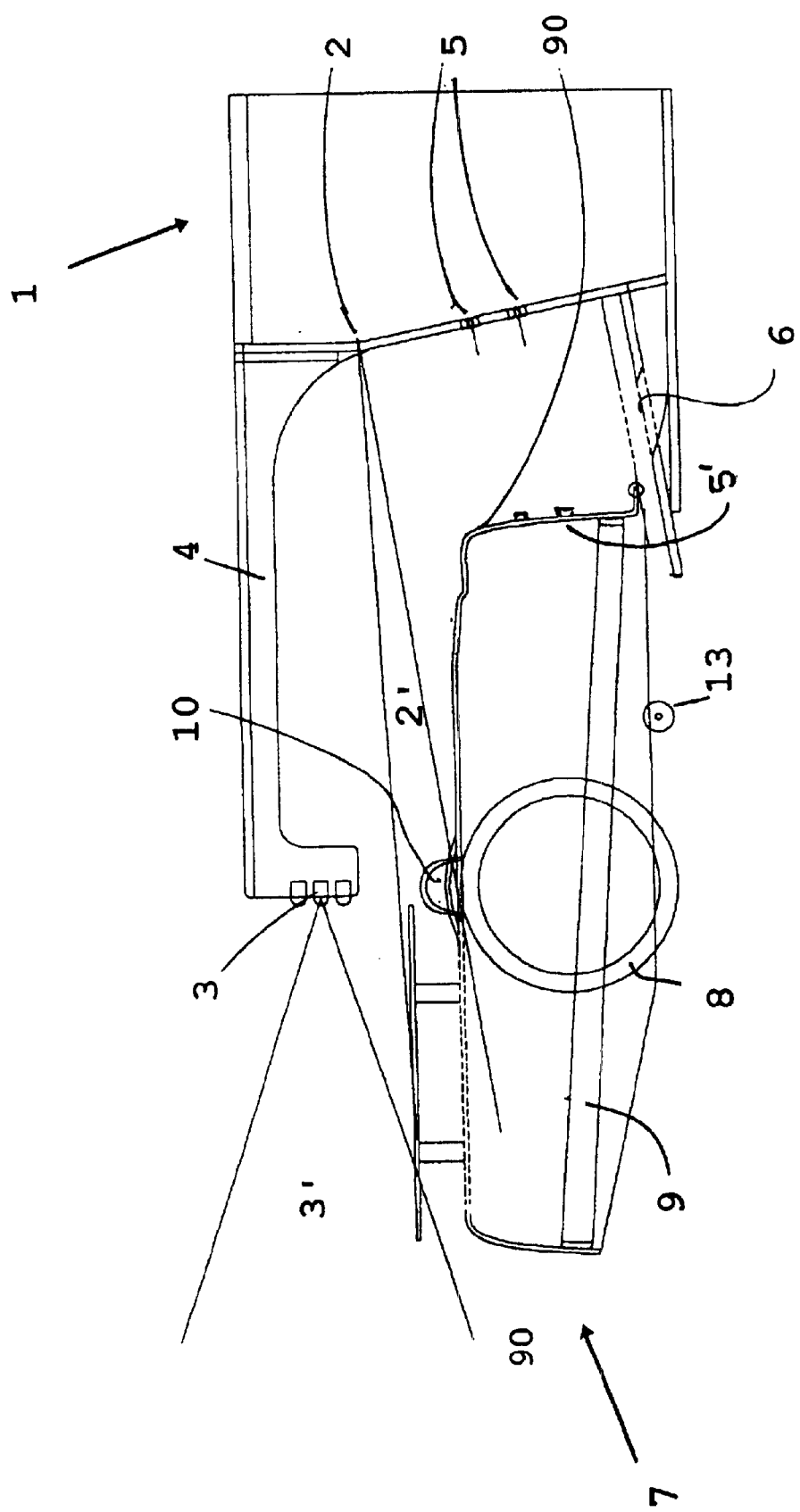
Figure 5:
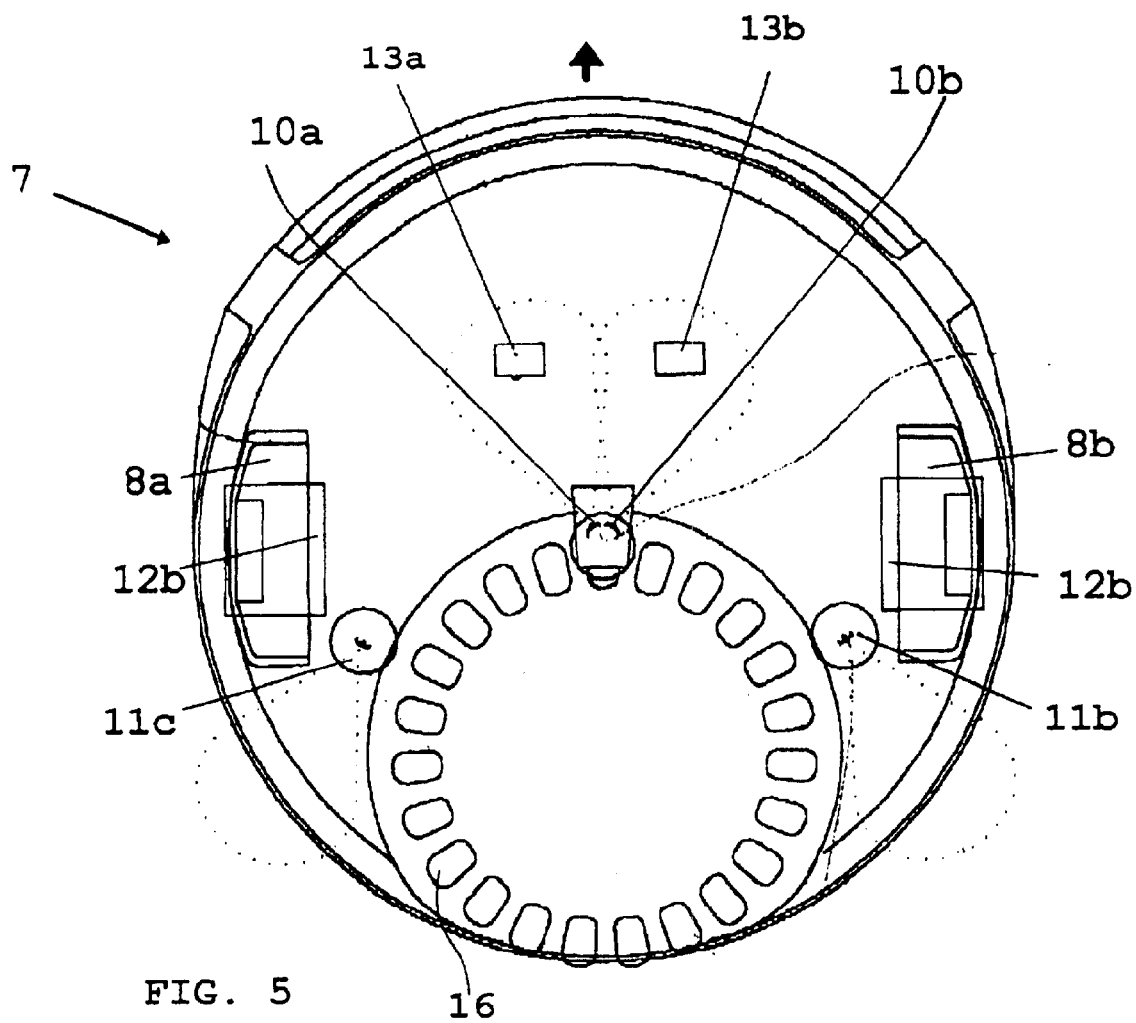
Figure 6:
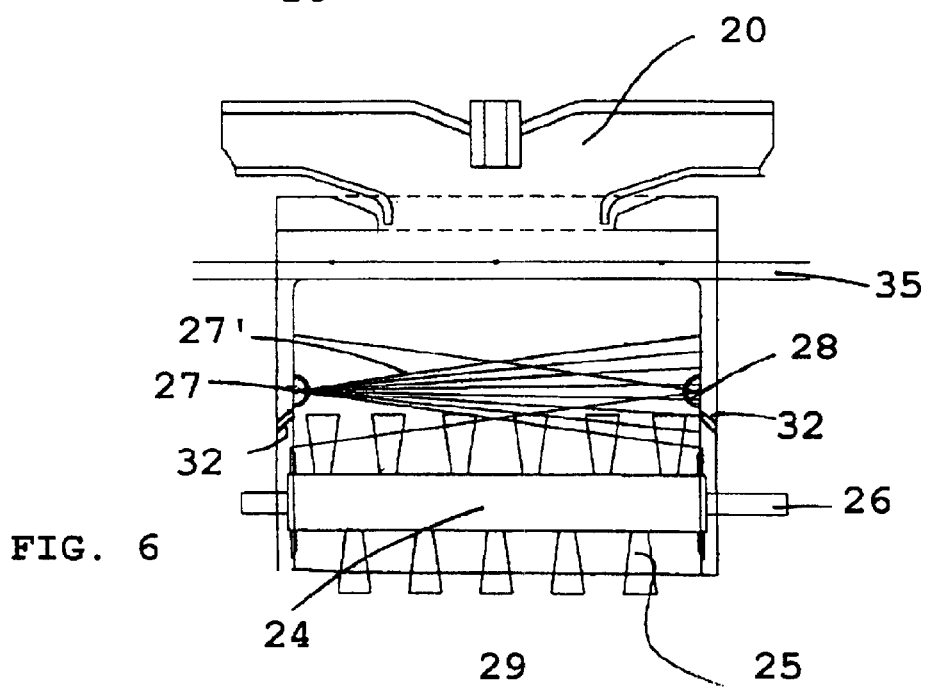
Figure 7:
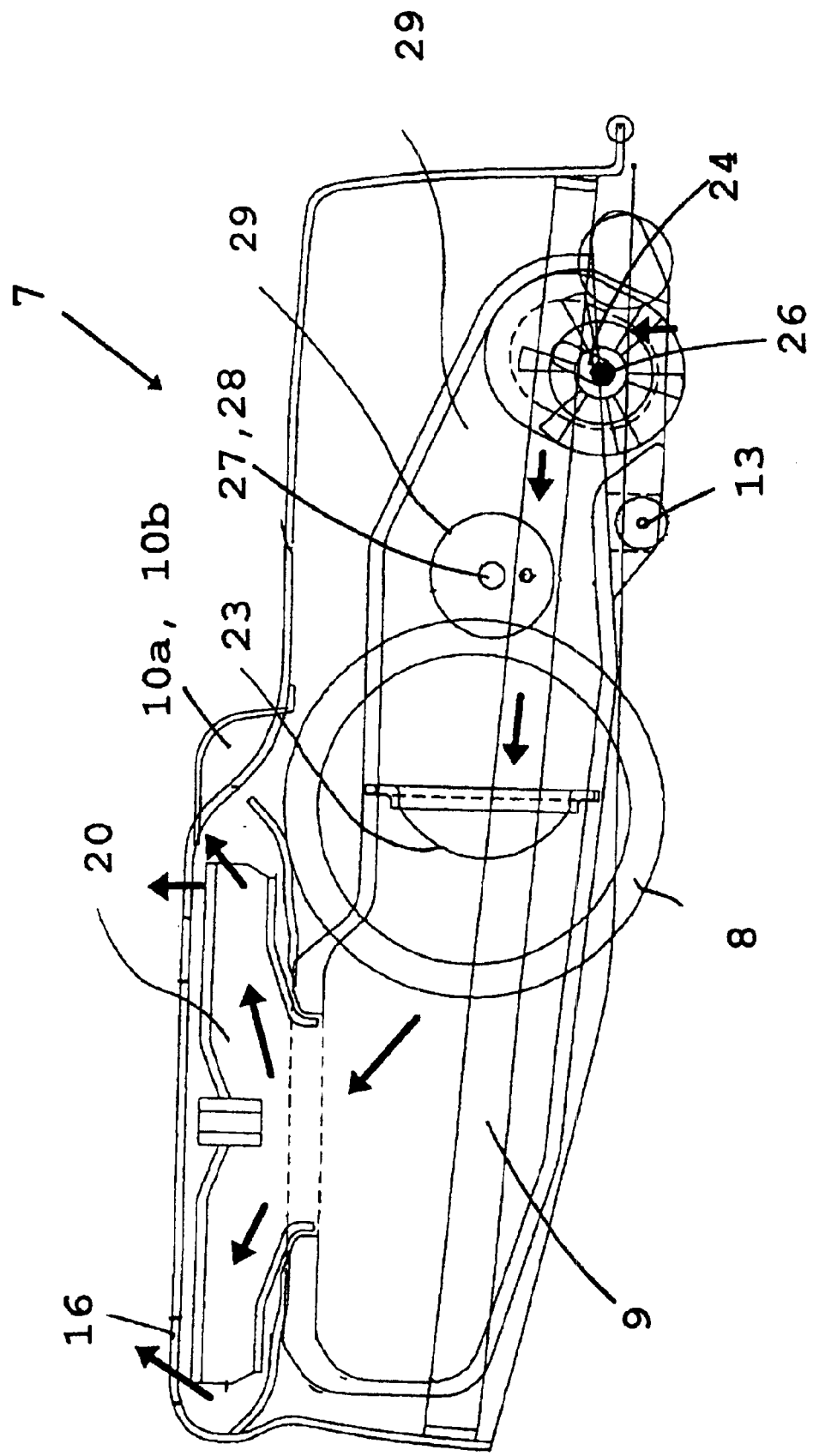
Figure 8:
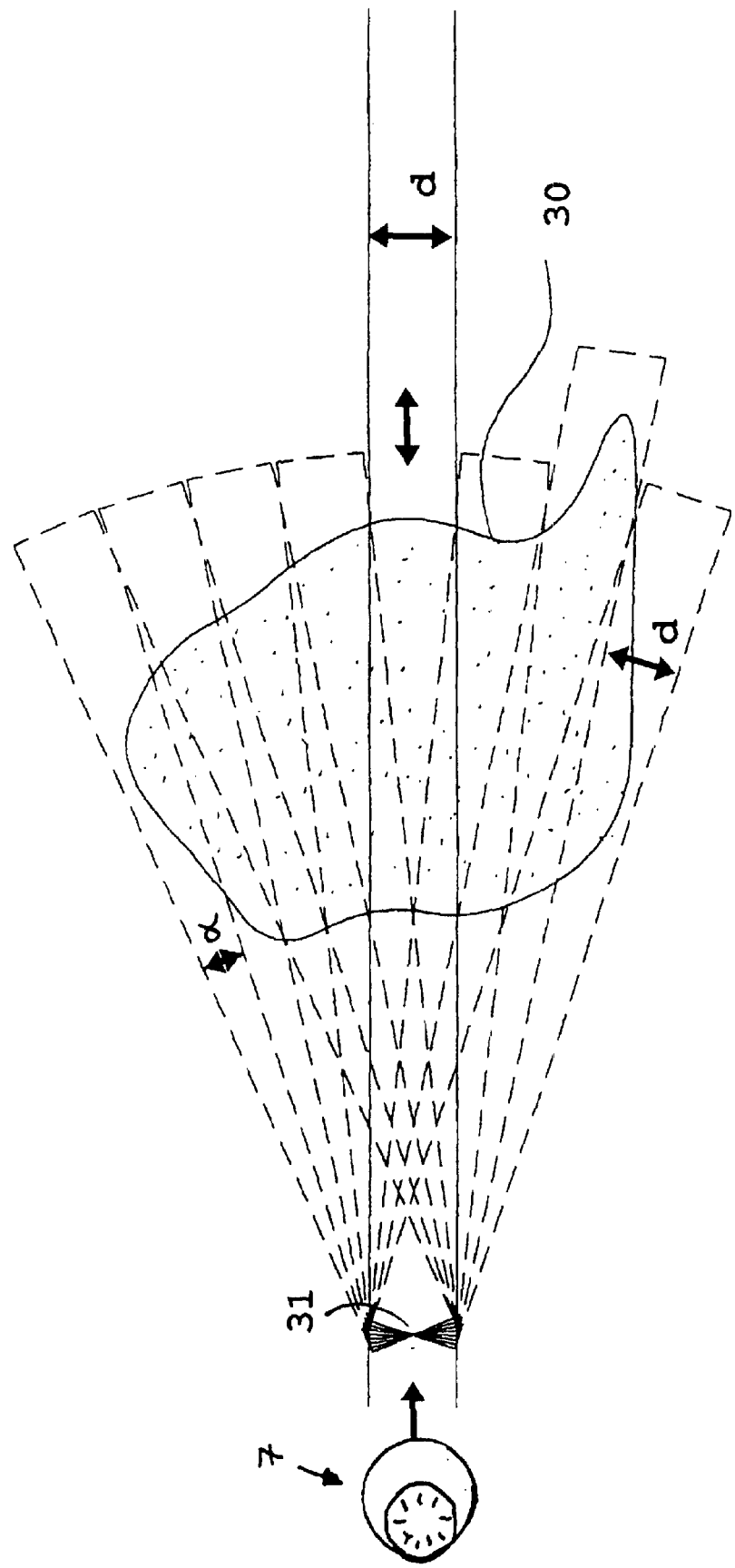
Figure 9:
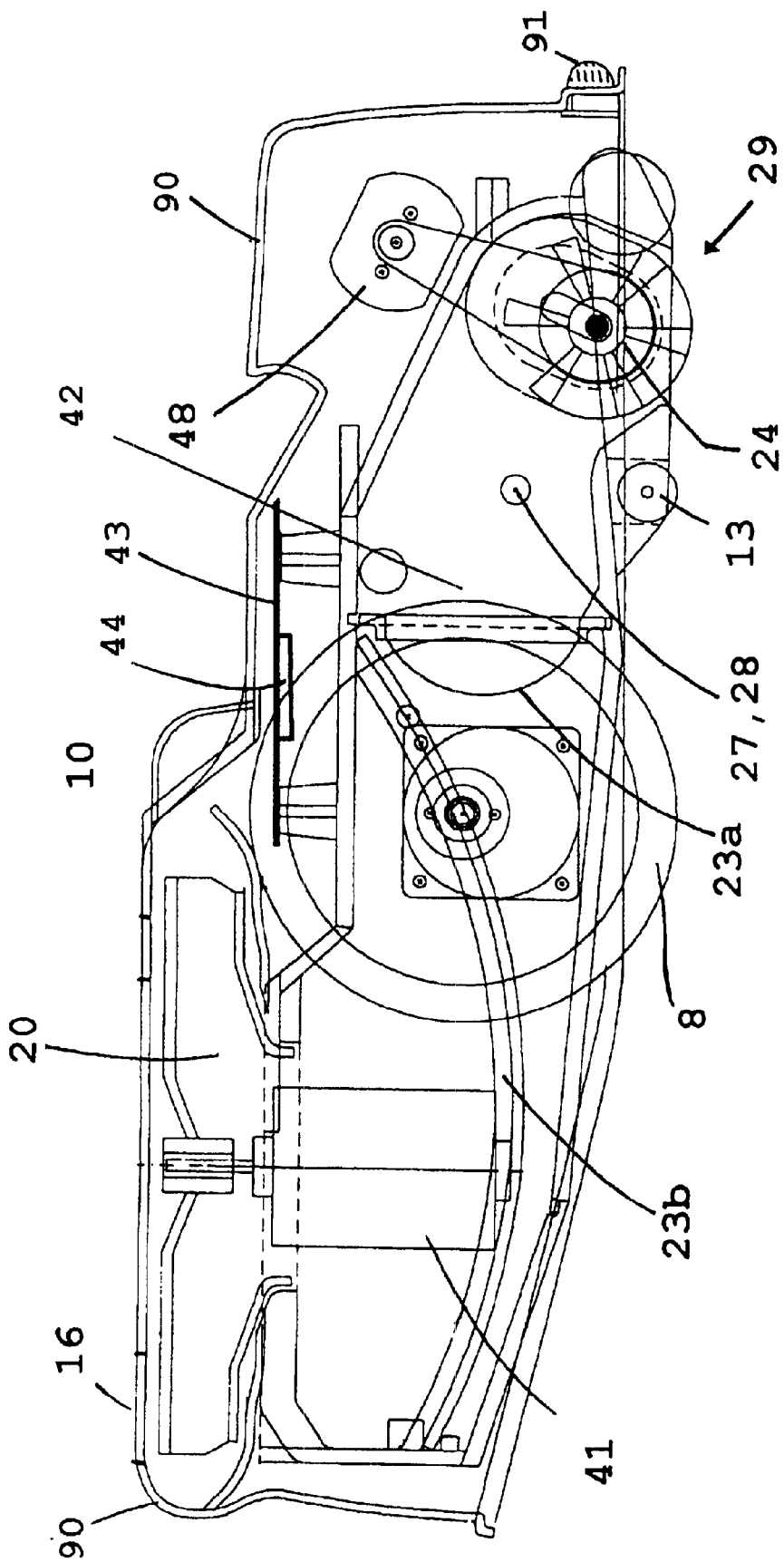
Figure 10:
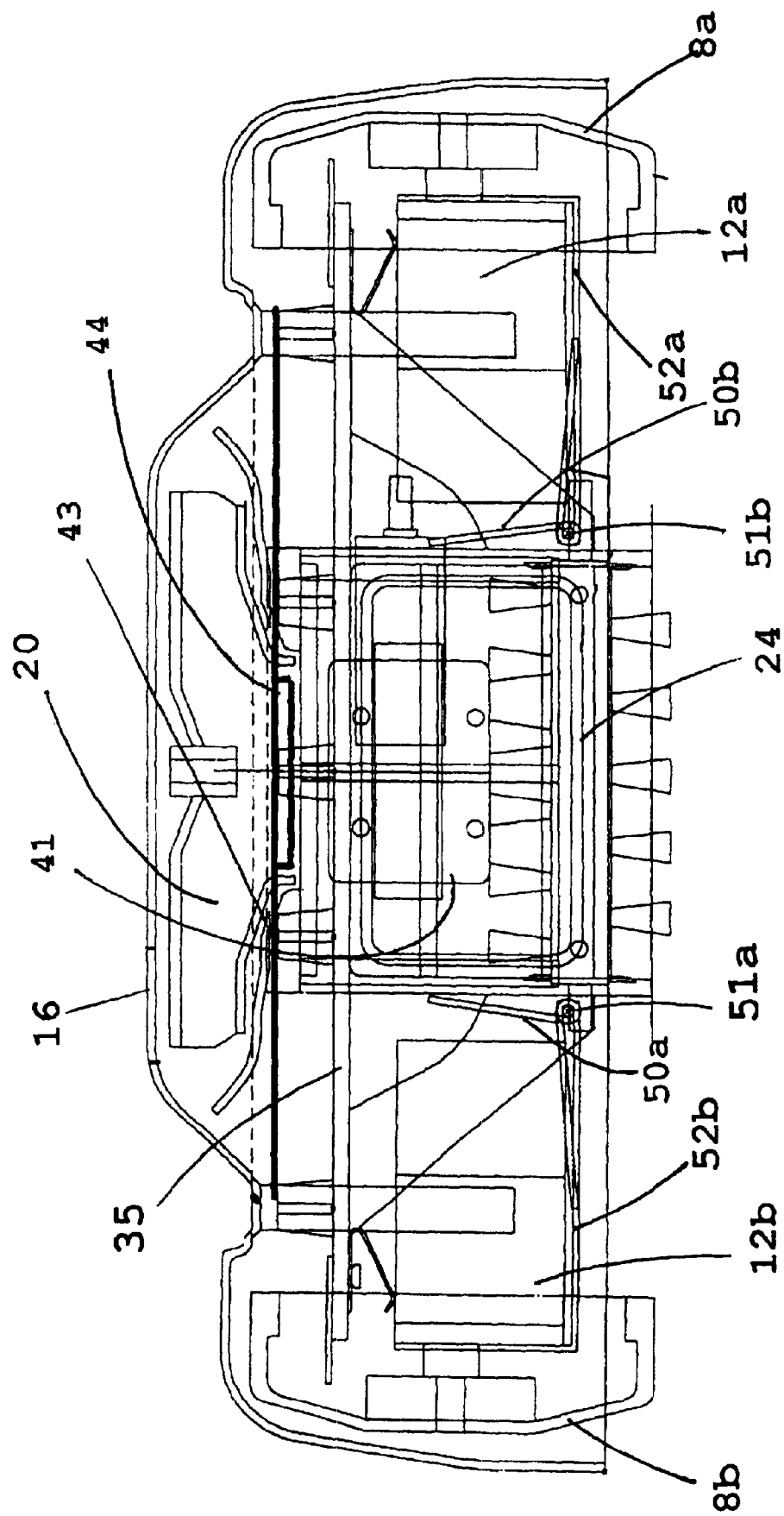

In the drawings,

FIG. 1 schematically represents a side view of the fixed station comprising two infra-red transmitters, FIG. 2 schematically represents a top view of the fixed station, FIG. 3 represents schematically a top view of an alternative embodiment of the fixed station FIG. 4 represents schematically the station and one approaching mobile robot, FIG. 5 represents schematically a top view of a circular mobile robot, FIG. 6 is a diagrammatic sectional view of the front of a suction unit of a robot provided with a brush according to the invention and of a system of detection of dust, FIG. 7 is a diagrammatic side view of a robot with a brush according to the invention FIG. 8 is a view illustrating the technique of cleaning FIG. 9 is a side view of a robotic vacuum cleaner with a brush FIG. 10 is a front view of the robot of FIG. 9

Figure 11:
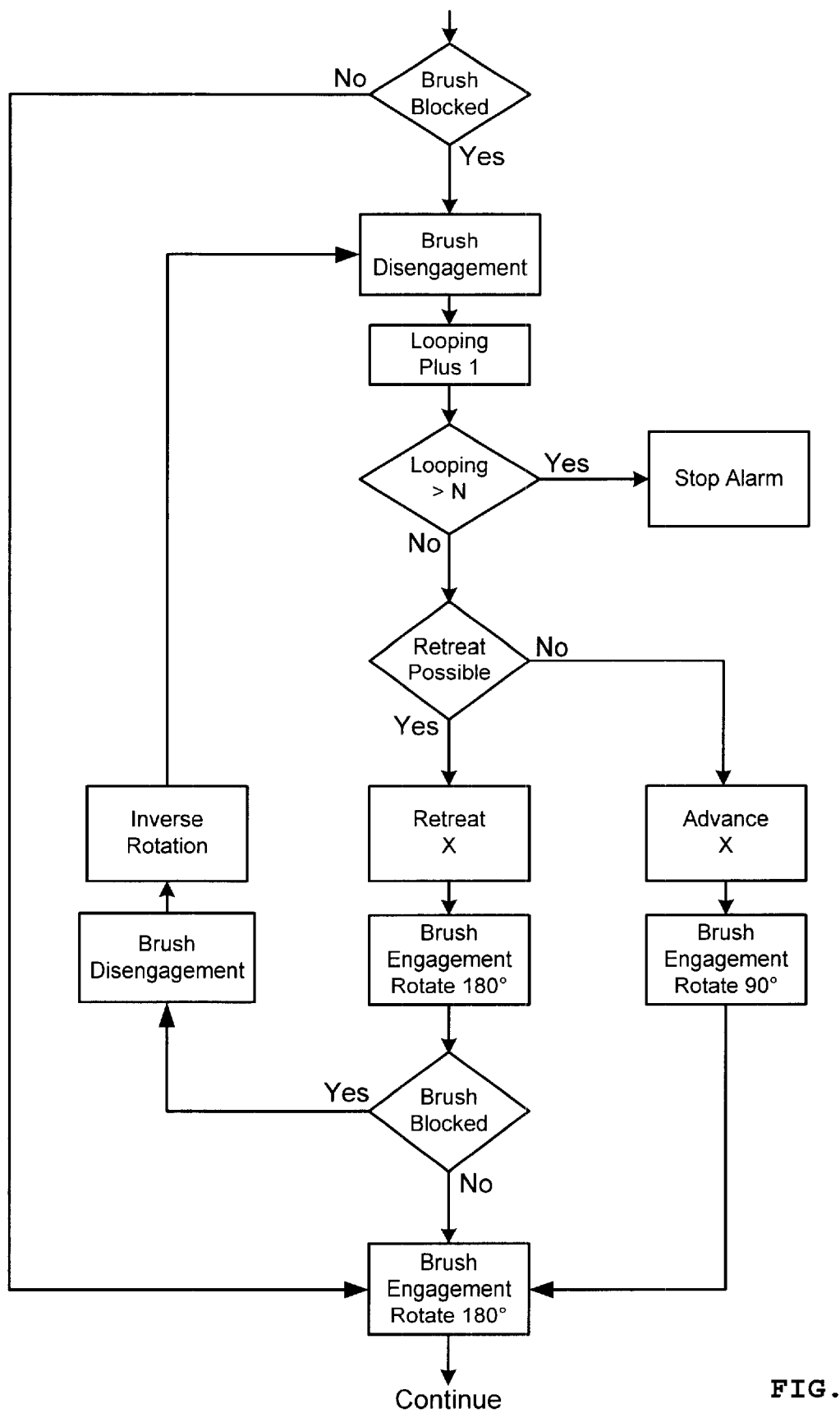

FIG. 11 illustrates an algorithm of disengagement resulting from the blocking of the brush FIGS. 12a to 12c illustrate a method of localization of the point of impact of the robot with an obstacle.

While referring to FIGS. 1 and 2, the fixed station 1 comprise two infra-red beam generators 2,3. The infra-red light is modulated at a frequency of a few kilocycles (p.e. 56 KHz). The station comprises a transmitter IR 2 emitting a narrow beam from approximately 5°, of low power, and a transmitter IR 3 emitting a broad beam possibly omnidirectional, of higher power. Transmitter 3 is located so that the mobile machine can freely position itself below it, its center of rotation being able to face the origin of the beam 3'. The transmitter can thus be placed at the end of an arm 4 overhanging the base, or docking plate for the robot, of the recharge station.

According to another embodiment illustrated at FIG. 3, the origin of the beam 3' can possibly be one virtual origin 3a obtained by the crossing at the point 3a of two beams of origin 3b and 3c.

The fixed station comprises the various elements necessary for its function: for example, for a vacuum cleaner, a system for recharging the battery comprising contacts 5 and discharge outlet 6.

The mobile robot 7 illustrated schematically in FIGS. 4 and 5 is a robotic vacuum cleaner comprising one or several rechargeable batteries. The robot is essentially circular and comprises two driving wheels 8, allowing in particular a rotation about its central axis. There will be noted the presence of a circular ring for side reinforcement of the body 90.

There is shown, laid out in a circle, the exit openings 16 of the turbine of the vacuum cleaner. Also shown are two driving wheels 8a, 8b operated by both motors 12a, 12b, and small free casters 13 near the suction inlet (not illustrated).

The machine comprises in its center of rotation at least one direction al infra-red sensor 10, preferably two (10a, 10b), in the latter case preferably forming between them an angle equal to their detection angle. The one or several sensors are oriented in the direction of the forward movement of the mobile machine. Additional sensors 11a, 11b directed differently, preferably backward, can advantageously complete the device. The location of this or of these additional sensors does not have to be at or near the center of rotation of the machine. Signals coming from the various sensors are amplified, filtered and directed to the microprocessor controlling the movement of the machine, by the intermediary of one A/D converter. Lobes of sensitivity of detection (directionality) are illustrated in dotted lines.

The signals can possibly be multiplexed that is to say analyzed sequentially by the microcomputer carried in the robot, each signal being connected in its turn with the chain of amplification and of conversion by means of an electronic switch.

The infra-red beam of strong power 3' covers a part of the surface on which the machine moves. The beam covering is obtained either directly if there is no obstacle in the pathway of the beam, or indirectly by reflection or diffraction in the contrary case. This allows the IR light to penetrate in parts of the space not being in direct sight of the source. The use of broad and high power beams allows the full covering of for example rooms communicating by doors. In very complex environments, it can be useful, in addition, to lay out reflectors or even repeaters.

The mobile machine moving in a essentially random manner, there is always during its displacement a moment when one of its two sensors will detect the I.R. signal, either coming straight from the source or by reflection.

The microcomputer will then control, in a known way, a rotation of the machine in order to obtain the same signal on the two frontal sensors 10a and 10b and a minimal signal at the back (this in the case of the use of 3 or more sensors, 11a, 11b).

The microcomputer will then make the machine progress towards the origin of the signal, i.e. the fixed station 1. This latter aspect of the technique of "homing" is known in itself.

If the signal comes from a reflection, at one moment the machine moving towards the point of reflection will meet the direct beam emitted by transmitter 2 (see FIGS. 1–4), or a radiation of a degree of reflection less than the one originally sensed. It will then rotate automatically towards the source signal after balancing the signals of its two frontal sensors 10a, 10b.

Once arrived near the fixed station, the mobile machine 7 will come to a position so as to make coincide the sensors located at its center of rotation (frontal sensors 10a, 10b) in the vicinity of the origin of the beam 3.

Its approach being able to be made from several directions, its position will probably not be adequate to realize an electric connection via connectors 5, 5' with the charger, or any other operations. At this point of time the narrow beam 2' of low power will play its role. Arriving at the level of the generator 3, the signal collected by the sensors 10a, 10b decreases considerably and becomes definitely less strong than the signal coming from narrow beam 2'. Indeed the sensors are not omnidirectional and are not conceived, in particular, for detecting effectively an infra-red signal in the vertical direction relative to the surface of displacement.

Machine 7 will thus rotate on itself to align the sensors with beam 2' and to start again its progression in such a way to position accurately on the fixed station, and to allow thus, for example, a physical electric connection via connectors 5, 5' for recharging the batteries.

Another aspect of this invention is illustrated in FIGS. 6 to 8.

FIG. 6 is a diagrammatic front sectional view of the suction unit of the robot supported by an element of chassis 35, which is a variant of FIGS. 4 and 5. The robot is provided with a brush roller 24 made up of brushes 25 turning around an axis 26.

There is shown in FIG. 7 a turbine 20 for the suction, driving wheels 21, a filter 23, the circular area 29 covered by the transmitter 27, said area being centered on sensor 28, and infra-red sensors 10a, 10b. Arrows in FIG. 7 indicate the path of the air in the robotic vacuum cleaner.

The particular device for the detection of dust according to a embodiment the invention is provided in the mobile robot and comprises two parts:

an analyzer of dust on the one hand made up of one infra-red transmitting element 27 and of a infra-red detecting element 28. These two elements are laid out on one and the other side of the suction inlet 29 and are located along their mutual axis. When dust is sucked or projected by the rotary brush roller 24, there is created a diffraction in the beam 27', while passing between the transmitting element and the detecting element, generating in that way a variation of signal at the output of the detecting element 28.

The amplitude of the variation of the signal is roughly proportional to the size of the particles and to the number of particles passing through the beam each second.

This signal, after amplification by a logarithmic amplifier, is analyzed by the microcomputer controlling the machine.

The value of the average intensity of the beam at the receiver is also communicated to the microcomputer.

On the other hand, the microcomputer is associated with a program allowing to react in accordance with the data communicated by the above-mentioned analyzer.

The operation of the machine according to this mode of operation is described hereafter.

When the machine moves on the surface to clean, the signal coming from the dust sensor is constantly analyzed by the microcomputer. The latter will make the machine run, for example, in the following way If the dirty surface is small (detection of particles on a distance less than 1 cm), the machine decrease its speed so as to increase the time of cleaning in the relevant zone. This variation of speed can also be related to the dimension and the frequency of detected grains.

If the dirty surface is more important (detection of particles at a distance for example between 1 and 5 cm), the machine carries out a back and forth movement until there is no more dust to detect. It resumes then its forward movement.

If finally dirty surface is sufficiently important (for example more than 5 cm), the machine returns in one systematic mode of cleaning as described in FIG. 8.

In FIG. 8 the distance D is the effective width of suction of machine 7.

The machine, guided by the microcomputer, starts by making an outward and return movement to determine the total length of spot 30. Once returned to its starting point 31, it performs a rotation to the right by an angle a which depends on the length of the spot. The machine progresses up to the edge of spot 30 and returns to its starting point 31 in order to carry out a new rotation to the right. So on until the right part of the spot is cleaned (absence of detection of particles). It takes again the direction of the axis of the spot while turning left by one angle equal to the sum of the increments carried out towards the right-hand side and reiterates the same scenario starting from the center but towards the left.

When an absence of particles is detected on the left, it returns in center 31 and resume its normal progression.

Other algorithms of systematic cleaning can to be adopted (spiral path etc.), in a less preferred manner.

The level of dirtiness being able to strongly differs from a room to the other, it can be interesting to start the process of systematic cleaning as described previously only if the level of instantaneous dirtiness is definitely higher than the average level of the room. This is realized by keeping in memory a global average of level of dust as detected by the dust sensor on a long distance.

According to another aspect, the arrangement for dust detection can be assembled in such a way that a flow of vacuum-cleaned air or air without dust is directed towards the sensor and/or the transmitter 27, 28 to prevent the fast dirt accumulation.

This flow is brought for example by channels 32 provided in the wall opening in an outlet located under the sensor and/or the transmitter. Alternatively, in a manner presently less preferred, the flow of air can be brought by a duct deviating some of the air exiting the turbine.

Dirt accumulation could however occur and so cause a decrease of the amplitude of the received signals. This dirt accumulation is detected by the microcomputer thanks to the second signal coming from the sensor ( being average intensity of the beam). The microcomputer can either take account of this accumulation of dirt by automatically compensating the readings, or act on the infra-red transmitter in such a way to keep constant the average illumination of the receiver.

FIGS. 9 and 10 illustrate the components of a robotic vacuum cleaner with a brush roller and with detection of dust according to another embodiment of the invention.

There is shown a turbine 20 with the associated motor 41 in order to suck the air and the dust from the inlet suction 29. There is also shown a first filter 23a, and a second, finer filter 23b, the driving wheels 8a and 8b, and the geared motors 12a, 12b and one pair of casters 13, motor 48 for the brush roller 24, the container 42 for dust, front IR sensors 10 and bumper 91 on body 90. There is also illustrated the integrated circuits board 43 supporting the microprocessor 44. At FIG. 10, there is shown more precisely the suspension springs 50a, 50b with two arms (with axis 51a, 51b) and articulated supports 52, 52a for the motors 12a, 12b.

FIG. 11 is a diagram illustrating a example of algorithm according to the invention, being operated in the case of blocking of the brush roller of the robot.

FIGS. 12a to 12c represents an arrangement for the detection of the point of impact of the robot with an is obstacle. FIG. 12a is a transverse section, FIG. 12b is a longitudinal section and FIG. 12c represents the element 61, 62 at the perimeter of the robot 7 (sheath 60 is not shown).

The base or lower part of the robot is essentially surrounded, in the plane of movement, by a hollow linear insulating element 60. This element 60 includes internally and longitudinally a flexible linear resistive element 61 made via adhesive 63 with an external part, by relative to the robot, of the internal side. This element is a resistive element made up of a conducting rubber. The ends of this resistive element are subjected to a potential difference of 5 V. Opposite to this resistive element 61 there is provided a metallic conducting element 62 possibly attached to 60 also by joining. An impact with an obstacle 65 on element 60 will cause a resilient contact between the resistive element 61 and the conducting element 62. The measurement of the voltage on the conductor makes it possible to determine the distance D and thus to deduce the location of the impact. It will be understood that this technique of detecting a point of impact can be applied largely in the field of the mobile robots. For certain applications one can also envisage several elements 60 in different planes.

The invention refers to any new element disclosed in the present specification, that the expert will understand suitable to be considered separately or in combination.

What is claimed is:

1. A cleaning robot comprising a rotary brush and a microcomputer, means for detecting the blocking of the rotary brush and an algorithm of disengagement of the robot being associated to said microcomputer, means for disconnecting the rotary brush relative to the associated motor, the algorithm including, during a blocking, a movement of retreat of the robot followed by a rotation and the resumption of forward movement.

2. Robot according to the claim 1 in which the means for disconnecting the rotary brush involves disconnection of the motor from its electrical supply.

3. Robot according to claim 1 including means whereby the number of revolutions of the brush is constantly analyzed by the microcomputer.

4. Robot according to claim 1 in which the algorithm of disengagement comprises a retreat of a distance equal to its diameter, the axis of the brush being in free wheel.

5. Robot according to claim 4 in which the operation of disengagement includes, after said retreat, a rotation and an operation of re-engagement of the brush, an analysis of the state of blocking or releasing of the brush, and in the event of the blocking persisting, a stop of the rotational movement and a new retreat followed by a new attempt at rotation and so on until the brush is released, the maximum number of reiterations being fixed by a program and by the maximum free distance left for the retreat of the robot.

6. Robot according to claim 5 wherein, if this maximum distance is reached without the brush being released, the robot will continue the iterations but in forward movement.

7. Robot according to claim 1 in which the algorithm provides that if no operation succeeds with the release of the brush, a mode of waiting for a manual intervention is applied.

8. Robot according to claim 1 wherein the microcomputer controls, via an algorithm, at least the speed and/or the path of the robot and wherein the microcomputer is associated with an algorithm which takes into account, in order to determine the aforementioned speed and/or the aforementioned path, the measurement of the rotational speed of the aforementioned rotary brush.

9. Robot for cleaning according to claim 8 characterized in that it is a robotic vacuum-cleaner.

10. Robot according to claim 9 characterized in that the microcomputer takes at least in account, for determining the power of aspiration, the measurement of the revolution speed of the aforementioned rotary brush.

11. Robot according to claim 1 wherein the algorithm incorporates a guiding technique for the cleaning of the ground characterized in that the path followed by the robot depends on the quantity of particles present on the surface to clean, the said quantity being estimated by a particle analyzer located near the suction nozzle of the robotic vacuum cleaner, the aforementioned analyzer sending the signals to the microcomputer carried by the mobile robot and controlling the displacement of the robot according to the said signals.

12. Robot according to claim 1 wherein the algorithm can cause a deceleration and/or a linear back and forth movement and/or a back and forth movement in a fan shape of the mobile robot.

13. Robot according to claim 1 characterized in that it comprises a linear sensor of collision surrounding entirely or partly the lower outside portion of the careenage, the sensor including a linear metal conductor and, in parallel, a linear element made of conducting plastic, for example conducting rubber, whose ends are subjected to a potential difference, the linear element in plastic being able to come elastically into contact with the conducting linear element under the effect of a temporary pressure resulting from the impact of the robot with an obstacle, the measurement of the current measured at the level of the conducting element being a signal fed to the microcomputer to locate the point of impact at the lower outside portion of the careenage.

14. A robotic vacuum cleaner comprising a rotary brush and a microcomputer, a means of detecting the blocking of the rotary brush associated to said microcomputer, an algorithm of disengagement of the robot, a means of disconnecting the rotary brush relative to the associated motor, the algorithm including, during a blocking, a movement of retreat of the robot followed by a rotation and the resumption of forward movement.

15. Robot according to claim 14 wherein the microcomputer keeps in memory a global average of dust level as detected by the sensor of dust on a long distance, the activation of one particular algorithm for cleaning taking account of the aforementioned average.

16. Robot according to claim 14 characterized in that the microcomputer takes at least in account, for determining the power of aspiration, the measurement of the number of revolutions of the aforementioned rotary brush.

* * * * *